United States Patent
Ioannou et al.

(10) Patent No.: US 9,880,745 B2
(45) Date of Patent: Jan. 30, 2018

(54) REDUCING CONCURRENCY OF GARBAGE COLLECTION OPERATIONS

(71) Applicant: INTERNATIONAL BUSINESS MACHINES CORPORATION, Armonk, NY (US)

(72) Inventors: Nikolas Ioannou, Zurich (CH); Ioannis Koltsidas, Zurich (CH); Amit Margalit, Hod-Hasharon (IL); Rivka M. Matosevich, Zichron-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 15/187,994

(22) Filed: Jun. 21, 2016

(65) Prior Publication Data
US 2017/0364264 A1 Dec. 21, 2017

(51) Int. Cl.
  *G06F 12/00* (2006.01)
  *G06F 3/06* (2006.01)
  *G06F 12/02* (2006.01)

(52) U.S. Cl.
  CPC .............. *G06F 3/061* (2013.01); *G06F 3/067* (2013.01); *G06F 3/0644* (2013.01);
  (Continued)

(58) Field of Classification Search
  None
  See application file for complete search history.

(56) References Cited

U.S. PATENT DOCUMENTS

| 8,898,373 B1 | 11/2014 | Kang et al. |
| 2005/0180438 A1* | 8/2005 | Ko .......................... H04L 45/02 370/401 |

(Continued)

FOREIGN PATENT DOCUMENTS

CN 102023896 A 4/2011

OTHER PUBLICATIONS

Bergel et al., "Reducing Waster in Expandable Collections: The Pharo Case," ACM, http://www.pharo-project.org (17 pages).

(Continued)

*Primary Examiner* — John A Lane
(74) *Attorney, Agent, or Firm* — Griffiths & Seaton PLLC

(57) ABSTRACT

Methods, computing systems and computer program products implement embodiments of the present invention that include identifying, in a storage system including multiple storage devices having respective sets of storage regions, respective default low storage region thresholds that are used for garbage collection. For each given storage region, a time threshold and an alternative low storage region threshold greater than the default low storage region threshold for the given storage device are defined. While processing input/output operations for each given storage device, a count of unused storage regions in the given storage device is maintained, a timer is initialized, and upon the timer matching the time threshold for the given storage device and upon the count of unused storage regions being less than or equal to the alternative low storage region threshold, a garbage collection operation is initiated. In some embodiments, processing the input/output operations includes using a log-structured array format.

20 Claims, 3 Drawing Sheets

(52) U.S. Cl.
CPC .......... *G06F 3/0652* (2013.01); *G06F 3/0653* (2013.01); *G06F 3/0683* (2013.01); *G06F 12/0269* (2013.01); *G06F 2212/1016* (2013.01); *G06F 2212/261* (2013.01); *G06F 2212/263* (2013.01)

(56) References Cited

U.S. PATENT DOCUMENTS

| | | | |
|---|---|---|---|
| 2012/0042119 A1* | 2/2012 | Suzuki | G06F 12/02 711/103 |
| 2013/0091186 A1 | 4/2013 | Stephens et al. | |
| 2013/0110883 A1 | 5/2013 | Junqueira et al. | |
| 2013/0232308 A1* | 9/2013 | Yairi | G06F 1/14 711/156 |
| 2014/0089565 A1* | 3/2014 | Lee | G06F 3/061 711/103 |
| 2015/0193493 A1 | 7/2015 | Junqueira et al. | |
| 2016/0055081 A1* | 2/2016 | Kumpera | G06F 9/485 717/120 |
| 2016/0283372 A1* | 9/2016 | Davis | G06F 12/0261 |
| 2017/0177218 A1* | 6/2017 | Kanno | G06F 3/061 |

OTHER PUBLICATIONS

IBM, "Optimistic write barrier removal with zero overhead in a generational garbage collector," An Ip.com Prior Art Database Technical Disclosure, IPCOM000191611D, Jan. 8, 2010 (5 pages).

Anonymous, "Processing for Efficient Triggering of Soft Real-Time Java Garbage Collection to Optimize Throughput, Latency, and Power Consumed," An IP.com Prior Art Database Technical Disclosure, IPCOM000203697D, Jan. 29, 2011 (3 pages).

* cited by examiner

REDUCING CONCURRENCY OF GARBAGE COLLECTION OPERATIONS

FIELD OF THE INVENTION

The present invention relates generally to storage systems, and specifically to reducing concurrency of garbage collection activities in an evenly distributed homogenous storage system comprising log-structured storage devices.

BACKGROUND

In computer systems, garbage collection is the systematic recovery of pooled computer storage that is being used by a program when that program no longer needs the storage. By performing garbage collection on an as-needed basis, the computer system can free the storage for use by other programs (or processes within a given program). Additionally, by ensuring that a program using increasing amounts of pooled storage does not reach its quota, garbage collection can help ensure that programs executing on computer systems have the necessary memory resources to execute efficiently.

The description above is presented as a general overview of related art in this field and should not be construed as an admission that any of the information it contains constitutes prior art against the present patent application.

SUMMARY

There is provided, in accordance with an embodiment of the present invention a method, including identifying, in a storage system including multiple storage devices having respective sets of storage regions, respective default low storage region thresholds that are used for garbage collection, defining, for each given storage region, a time threshold and an alternative low storage region threshold greater than the default low storage region threshold for the given storage device, and while processing input/output operations for each given storage device, maintaining a count of unused storage regions in the given storage device, initializing a timer, and initiating a garbage collection operation upon the timer matching the time threshold for the given storage device and upon the count of unused storage regions being less than or equal to the alternative low storage region threshold.

There is also provided, in accordance with an embodiment of the present invention an apparatus, including multiple storage devices having respective sets of storage regions, and a processor configured to identify, for the multiple storage devices, respective default low storage region thresholds that are used for garbage collection, to define, for each given storage region, a time threshold and an alternative low storage region threshold greater than the default low storage region threshold for the given storage device, and while processing input/output operations for each given storage device, to maintain a count of unused storage regions in the given storage device, to initialize a timer, and to initiate a garbage collection operation upon the timer matching the time threshold for the given storage device and upon the count of unused storage regions being less than or equal to the low storage region threshold.

There is further provided, in accordance with an embodiment of the present invention a computer program product, the computer program product including a non-transitory computer readable storage medium having computer readable program code embodied therewith, the computer readable program code including computer readable program code configured to identify, in a storage system including multiple storage devices having respective sets of storage regions, respective default low storage region thresholds that are used for garbage collection, computer readable program code configured to define, for each given storage region, a time threshold and an alternative low storage region threshold greater than the default low storage region threshold for the given storage device, and while processing input/output operations for each given storage device, computer readable program code configured to maintain a count of unused storage regions in the given storage device, computer readable program code configured to initialize a timer, and computer readable program code configured to initiate a garbage collection operation upon the timer matching the time threshold for the given storage device and upon the count of unused storage regions being less than or equal to the low storage region threshold.

BRIEF DESCRIPTION OF THE DRAWINGS

The disclosure is herein described, by way of example only, with reference to the accompanying drawings, wherein.

DETAILED DESCRIPTION OF EMBODIMENTS

Some storage systems comprise high performance storage devices such as solid-state disk (SSD) or shingled magnetic (SMR) drives. Since SSDs and SMRs usually store data sequentially, the storage system can use a log-structured array format that to maintain a mapping between logical addresses for the data and physical addresses of the data on the drives. For example, since data stored on SSDs cannot be directly overwritten, updating a data block originally stored on a given storage region on an SSD typically comprises the steps of appending the updated data block to the next available (i.e., sequential) storage region on the SSD, and marking the given storage region as unused. As the number of unused storage regions increases, the SSD can perform garbage collection to reclaim the storage space used by the unused storage regions.

Large scale storage systems typically attempt to evenly distribute data over a set of storage devices in order to effect optimal utilization of storage resources in the storage system. When I/O operations are evenly distributed across multiple log-structured devices that have identical characteristics (e.g., identical hardware and parameters), the log-structured garbage collection is likely to trigger in close temporal proximity, thereby impacting the performance of the storage system.

Embodiments of the present invention provide methods and systems for reducing concurrency of garbage collection activities in an evenly distributed homogeneous storage system comprising log-structured storage devices. As described hereinbelow, in a storage system comprising multiple storage devices having respective sets of storage regions, respective default low storage region thresholds that are used for garbage collection are identified, and for each given storage region, a time threshold and an alternative low storage region threshold greater than the default low storage region threshold for the given storage device are defined. While processing input/output operations for each given storage device, a count of unused storage regions in the given storage device is maintained, and a timer is initialized. A garbage collection operation can then be initiated upon the timer matching the time threshold for the given storage device and upon the count of unused storage regions being less than or equal to the low storage region threshold.

By introducing one or more random elements (i.e., the time threshold and the alternative low storage region threshold) to the triggering of garbage-collection operations of multiple storage devices, systems implementing embodiments of the invention can reduce the sudden performance degradation that can be caused by performing garbage collection on multiple storage devices simultaneously. The random element(s) can change the time at which each storage device begins its garbage-collection operations, thereby spreading out the garbage collection operations to achieve stable performance with no sudden hiccups.

Figure 1:
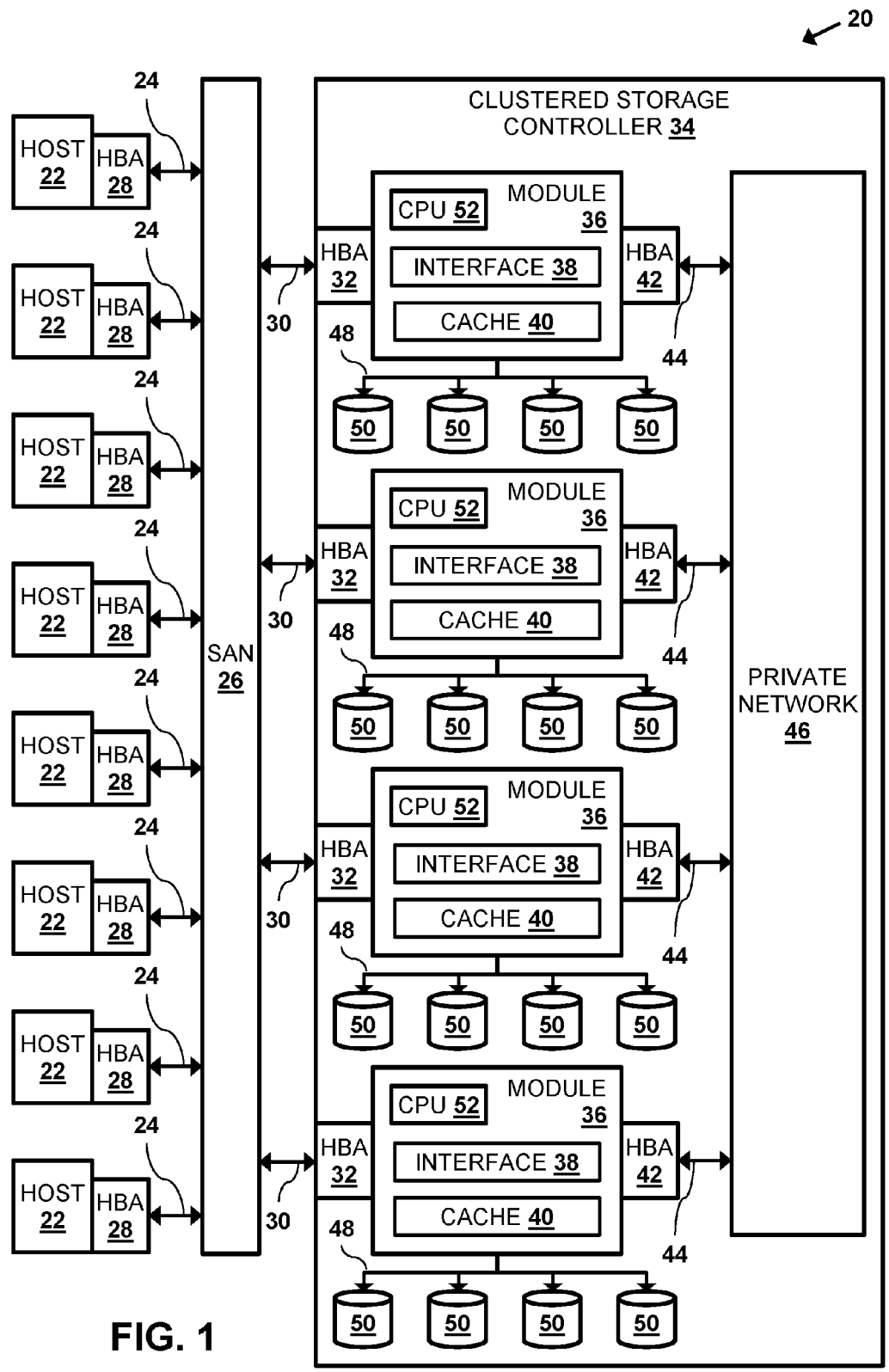
FIG. 1 is a block diagram that schematically illustrates a storage system comprising a storage controller having multiple modules, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
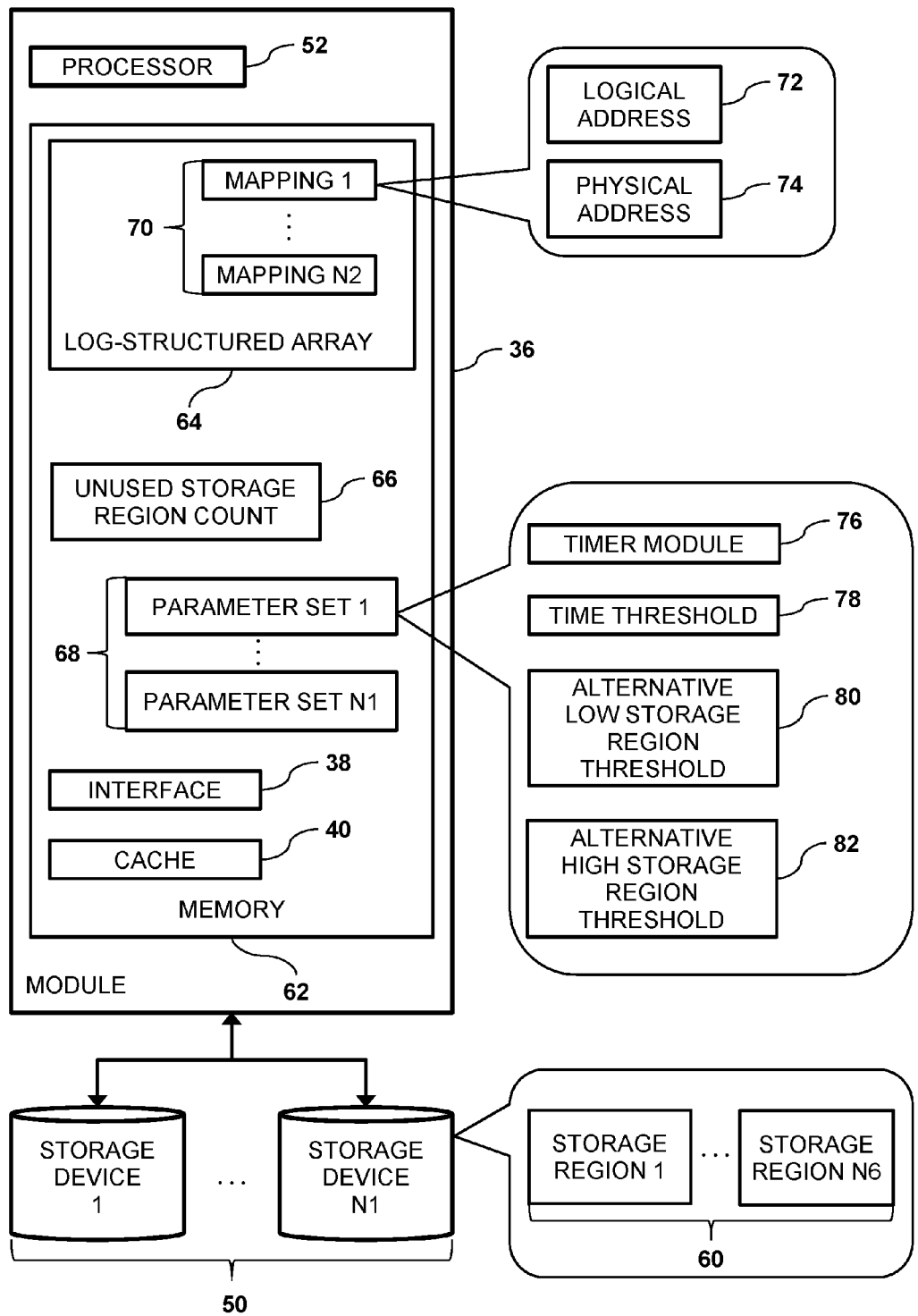
FIG. 2 is a block diagram that schematically illustrates configuration of given module configured to manage garbage collection in a plurality of log-structured storage devices, in accordance with an embodiment of the present invention.

FIG. 2 is a block diagram that schematically illustrates configuration of given module 36 configured to manage garbage collection in a plurality of storage devices 50 comprising log-structured drives such as SSDs and SMRs, in accordance with an embodiment of the present invention. Each storage device 50 comprises multiple storage regions 60 (also known as blocks and partitions) on the storage system that a storage administrator can combine in order to define one or more logical volumes. In operation, processors 52 evenly distribute data among storage devices 50 in clustered storage controller 34.

In addition to processor 52 and storage devices 50, each module 36 comprises a memory 62 that stores interface 38, cache 40, a log-structured array 64, an unused storage region count 66, and garbage collection parameter sets 68. Log-structured array 64 comprises multiple mappings 70, each of the mappings comprising a logical address 72 for a given storage region 60 and a physical address 74 for the given storage region on the storage devices.

Processor 52 uses log-structured array 64 to store data to storage devices 50 in a log-structured array format. In a typical log-structured array format, data and metadata are written sequentially to a circular buffer, called a log. As the storage device hosting the log-structured array format fills up, the processor can reclaim free space from the tail of the log to prevent the storage device from becoming full when the head of the log wraps around to meet it. The tail can release space (i.e., perform garbage collection) and move forward by skipping over data for which newer versions exist farther ahead in the log. If there are no newer versions, then the data is moved and appended to the head.

The configuration shown in FIG. 2 can reduce the overhead incurred by these garbage collection operations by dividing storage space on storage devices 50 into storage regions 60. In operation, the head of the log simply advances into non-adjacent storage regions 60 which are already free, and if additional space is needed, the least-full storage regions 60 can be reclaimed first. This can decrease the input/output load of the garbage collection, but typically becomes increasingly ineffective as the storage device fills up and nears capacity. In the example shown in FIG. 2, processor 52 maintains mappings 70 and unused storage region count 66 that stores a current count of unused storage regions 60. The unused storage regions comprise any storage regions 60 that are not currently referenced by any mapping 70.

Each parameter set 68 corresponds to a given storage device and comprises a timer module 76 (e.g., a clock) that automatically increments a counter at specific periods, a time threshold 78, an alternative low storage region threshold 80 and an alternative high storage region threshold 82. Each given storage device 50 typically comprises circuitry (not shown) that manages garbage collection for the given storage device by initiating a garbage collection operation when the unused storage region count is less than or equal to a default low storage region count (not shown), and ending the garbage collection when the unused storage region count equals (or exceeds) a default high storage region count (not shown). The respective low and the high storage region counts are typically initialized and managed by storage devices 50.

In some embodiments, each storage device 50 maintains a freelist (not shown) of available (i.e., unmapped) storage regions 60. In the configuration shown in FIG. 2, the garbage collection operation identifies any storage regions 60 that are not in the freelist and have no current mapping in log-structured array 64, and adds the identified storage regions 60 to the freelist. In operation, garbage collection in other types of storage devices implementing log-structured file systems SSDs is typically more complicated. For example, data is typically written to SSDs in units comprising a specified number of memory cells that are called pages, but the memory cells can only be erased in larger units called erase-blocks that comprise multiple pages. If the data in some of the pages of a given block are no longer needed, they may not be used until the entire erase-block gets erased, and that may only be done after relocating the pages with "good" data in the given erase-block into another previously erased empty block. Subsequent to the relocation, the entire erase-block may be erased, and all of its pages become available for new data.

In embodiments of the present invention, processor 52 manages, for storage devices 50, respective alternative low storage region thresholds 80. As described in the description referencing FIG. 3 hereinbelow, processor 52 can initiate a garbage collection operation for a given storage device 50 upon detecting that the unused storage region count for the given storage device is less than or equal to the alternative low storage region threshold for the given storage device. For a given storage device 50, processor 52 can randomly select a given alternative low storage region threshold 80 around a central target value, with restrictions that the alternative low storage region threshold is not lower than the default low storage region count for the given storage device 50, and not too high, so that the garbage collection efficiency is reasonable. Additionally, processor 52 can ensure that the given alternative low storage region threshold 80 is less than the number of "spare" storage regions 60 that the given storage device has over-provisioned.

As described hereinbelow, subsequent to initializing the corresponding timer module 76 for a given storage device 50, processor 52 initiates a garbage collection operation upon the corresponding timer module matching the corresponding time threshold 78 and detecting that unused storage region count 66 is less than or equal to the corresponding alternative low storage region threshold 80. In some embodiments, the corresponding time threshold may comprise a target value, and upon initiating the corresponding timer module, processor 52 can calculate a random value "around" the target value, and initiate the garbage collection operation upon the corresponding timer module matching the random value and detecting that unused storage region count 66 is less than or equal to the corresponding alternative low storage region threshold 80. In embodiments described herein using the random value is also referred to as selecting the time threshold from a group of defined values.

As described supra, processor ends a garbage collection operation for a given storage device 50 upon unused storage region count 66 meeting the default high storage region threshold. In additional embodiments, processor 52 can define respective alternative high storage region thresholds 82 for storage devices 50. In the additional embodiments, when processor 52 is performing a garbage collection operation for a given storage device 50 in response to detecting the corresponding timer module matching the random value and detecting that unused storage region count 66 is less than or equal to the corresponding alternative low storage region threshold 80, the processor can end the garbage collection operation upon unused storage region count 66 matching or exceeding the respective alternative high storage region threshold 82. Additionally, when selecting a given alternative high storage region threshold 82 for a given storage device 50 processor 52 can ensure that the given alternative high storage region threshold is greater than the alternative low storage region threshold for the given storage device and less than or equal to the number of "spare" storage regions 60 that the given storage device has over-provisioned.

While the configuration in FIG. 2 shows a given processor 52 in a given module 36 periodically using a given alternative low storage region threshold 80 to trigger a garbage collection operation on a given storage device 50, other configurations that use the alternative low storage region thresholds to trigger garbage collections operations in the storage devices are considered to be within the spirit and scope of the present invention. For example, each storage device 50 may comprise timing circuitry, a storage memory that stores the time and the alternative low storage region thresholds for the given storage device, and a storage processor that initiates a garbage collection operation on the storage device upon the timer module matching the time threshold for the given storage device and upon the count of unused storage regions on the given storage device being less than or equal to the low storage region threshold for the given storage device.

In configurations where storage controller 34 evenly distributes data across storage devices 50 and where the respective storage capacities of at least two of the storage devices are in accordance with one another, embodiments of the present invention can reduce the chance of multiple storage devices 50 simultaneously initiating garbage collection operations. In a first embodiment, the multiple storage devices whose respective storage capacities are in accordance with one another comprise storage devices 50 having a single make and model.

In a second embodiment, the multiple storage devices whose respective storage capacities are in accordance with one another may comprise different makes and/or models of storage devices, and the storage controller uses (i.e., on the multiple storage devices) respective amounts of storage space that are in accordance with one another. For example, if storage controller 34 may comprise five 4 TB hard drives and three 6 TB hard drives, then the storage controller can use 4 TB on each of the storage devices (and therefore leave 2 TB unused on each of the 6 TB hard drives) in order to evenly distribute data across storage devices 50.

As described supra, SSDs write data in storage units called pages and erase data in storage units known as erase-blocks (e.g., storage regions 60), wherein the erase-blocks typically comprise multiple pages. In embodiments of the present invention, the respective storage capacities on two storage devices 50 (e.g., SDDs) can be considered to be in accordance with one another if the storage capacities differ by less than two times the size of the erase-blocks (i.e., units of storage space that are reclaimed by garbage collection). For example, if the erase-block size on two SSDs is 64 KB, then the respective storage capacities of the two SSDs are considered to be in accordance with one another if the storage capacities of the two SSDs differ by less than 128 KB.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processors 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

MAXIMUM VOLUME SIZE CALCULATION

Figure 3:
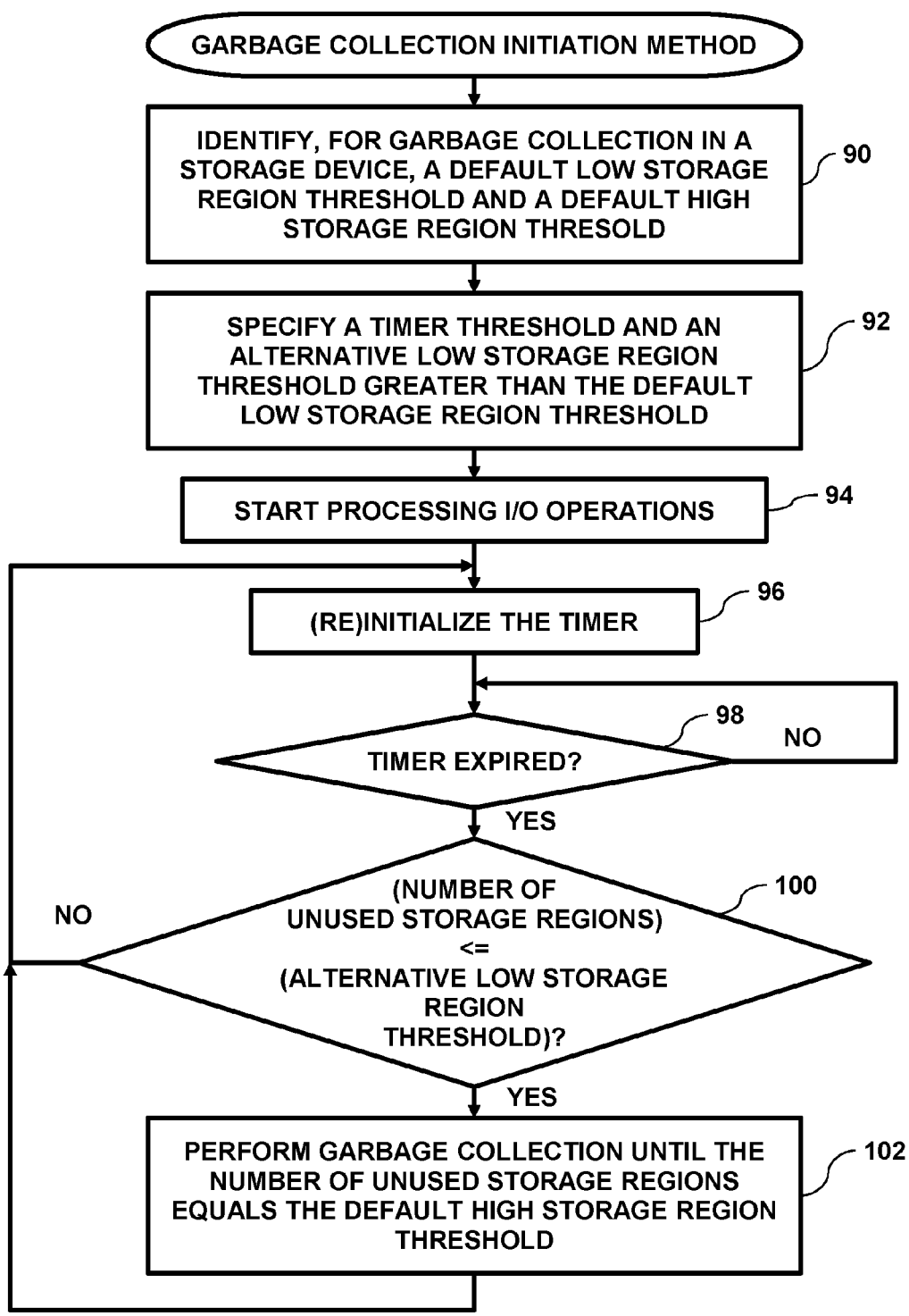
FIG. 3 is a flow diagram that schematically illustrates a method of reducing concurrency of garbage collection activities in the storage system, in accordance with an embodiment of the preset invention.

FIG. 3 is a flow diagram that schematically illustrates a method of reducing concurrency of garbage collection activities in storage devices 50, in accordance with an embodiment of the preset invention. While the flow diagram describes processor 52 managing garbage collection for a given storage device 50, the steps described in the flow diagram may be implemented concurrently for all storage devices 50 in clustered storage controller 34.

In an identification step 90, processor 52 identifies, for a given storage device 50, a default low storage region threshold and a default high storage region threshold, and in a specification step 92, the processor specifies time threshold 78 and alternative low storage region threshold 80. In an initiate step 94, processor starts processing input/output operations and in an initialization step 96, the processor initializes the counter in timer module 76 (also referred to herein as the timer).

Upon processor 52 detecting, in a first comparison step 98, the timer module expiring by the counter in the timer module matching the time threshold for the given storage device and the processor detecting, in a second comparison step 100, that unused storage region count 66 is less than or equal to the alternative low storage region threshold for the given storage device, then in a performance step 102, the processor initiates a garbage collection operation, and ends the garbage collection operation upon the unused storage region count matching the default high storage region threshold for the given storage device, and the method continues with step 96. Returning to step 100, if unused storage region count 66 is greater than the alternative low storage region threshold for the given storage device, then the method continues with step 96.

In alternative embodiments, as described supra, processor 52 may use a different threshold when repeating steps 96-102, and/or may end the garbage collection operation upon the unused storage region count matching or exceeding the alternative high storage region threshold for the given storage device.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
    identifying, in a storage system comprising multiple storage devices having respective sets of storage regions, respective default low storage region thresholds that are used for garbage collection;

defining, for each given storage region, a time threshold and an alternative low storage region threshold greater than the default low storage region threshold for the given storage device; and while processing input/output operations for each given storage device:
maintaining a count of unused storage regions in the given storage device,
initializing a timer, and
initiating a garbage collection operation upon the timer matching the time threshold for the given storage device and upon the count of unused storage regions being less than or equal to the alternative low storage region threshold.

2. The method according to claim 1, and comprising identifying, for the storage devices, respective default high storage region thresholds that are used for the garbage collection, defining, for each given storage regions an alternative high storage region threshold greater than the alternative low storage region threshold for the given storage device, and ending the garbage collection operation upon the count of unused storage regions equaling or exceeding the alternative high storage region threshold for the given storage device.

3. The method according to claim 1, wherein the time threshold is selected from a group of defined values.

4. The method according to claim 1, wherein processing the input/output operations comprises utilizing a log-structured array format to store data to the storage devices, and wherein the respective storage capacities of at least two of the storage devices are in accordance with one another.

5. The method according to claim 4, wherein processing the input/output operations comprises evenly distributing the data among the storage devices.

6. The method according to claim 1, wherein each of the storage devices is selected from a group consisting of a solid-state disk drive and a shingled magnetic recording disk drive.

7. The method according to claim 1, and comprising reinitializing the timer for a given storage device upon the timer matching the time threshold and the count of unused storage regions being less than the alternative low storage region threshold for the given storage device.

8. An apparatus, comprising:
multiple storage devices having respective sets of storage regions; and
a processor configured:
to identify, for the multiple storage devices, respective default low storage region thresholds that are used for garbage collection,
to define, for each given storage region, a time threshold and an alternative low storage region threshold greater than the default low storage region threshold for the given storage device, and
while processing input/output operations for each given storage device:
to maintain a count of unused storage regions in the given storage device,
to initialize a timer, and
to initiate a garbage collection operation upon the timer matching the time threshold for the given storage device and upon the count of unused storage regions being less than or equal to the low storage region threshold.

9. The apparatus according to claim 8, wherein the processor is configured to identify, for the storage devices, respective default high storage region thresholds that are used for the garbage collection, to define, for each given storage regions an alternative high storage region threshold greater than the alternative low storage region threshold for the given storage device, and to end the garbage collection operation upon the count of unused storage regions equaling or exceeding the alternative high storage region threshold for the given storage device.

10. The apparatus according to claim 8, wherein the time threshold is selected from a group of defined values.

11. The apparatus according to claim 8, wherein the processor is configured to process the input/output operations by utilizing a log-structured array format to store data to the storage devices, and wherein the respective storage capacities of at least two of the storage devices are in accordance with one another.

12. The apparatus according to claim 11, wherein the processor is configured to process the input/output operations by evenly distributing the data among the storage devices.

13. The apparatus according to claim 8, wherein each of the storage devices is selected from a group consisting of a solid-state disk drive and a shingled magnetic recording disk drive.

14. The apparatus according to claim 8, wherein the processor is configured to reinitialize the timer for a given storage device upon the timer matching the time threshold and the count of unused storage regions being less than the alternative low storage region threshold for the given storage device.

15. A computer program product, the computer program product comprising:
a non-transitory computer readable storage medium having computer readable program code embodied therewith, the computer readable program code comprising:
computer readable program code configured to identify, in a storage system comprising multiple storage devices having respective sets of storage regions, respective default low storage region thresholds that are used for garbage collection;
computer readable program code configured to define, for each given storage region, a time threshold and an alternative low storage region threshold greater than the default low storage region threshold for the given storage device; and
while processing input/output operations for each given storage device:
computer readable program code configured to maintain a count of unused storage regions in the given storage device,
computer readable program code configured to initialize a timer, and
computer readable program code configured to initiate a garbage collection operation upon the timer matching the time threshold for the given storage device and upon the count of unused storage regions being less than or equal to the low storage region threshold.

16. The computer program product according to claim 15, and comprising computer readable program code configured to identify, for the storage devices, respective default high storage region thresholds that are used for the garbage collection, to define, for each given storage regions an alternative high storage region threshold greater than the alternative low storage region threshold for the given storage device, and to end the garbage collection operation upon the count of unused storage regions equaling or exceeding the alternative high storage region threshold for the given storage device.

17. The computer program product according to claim 15, wherein the time threshold is selected from a group of defined values.

18. The computer program product according to claim 15, wherein the computer readable program code is configured to process the input/output operations by utilizing a log-structured array format to store data to the storage devices, and evenly distributing the data among the storage devices, and wherein the respective storage capacities of at least two of the storage devices are in accordance with one another.

19. The computer program product according to claim 15, wherein each of the storage devices is selected from a group consisting of a solid-state disk drive and a shingled magnetic recording disk drive.

20. The computer program product according to claim 15, and comprising computer readable program code configured to reinitialize the timer for a given storage device upon the timer matching the time threshold and the count of unused storage regions being less than the alternative low storage region threshold for the given storage device.

\* \* \* \* \*